Figure 1:
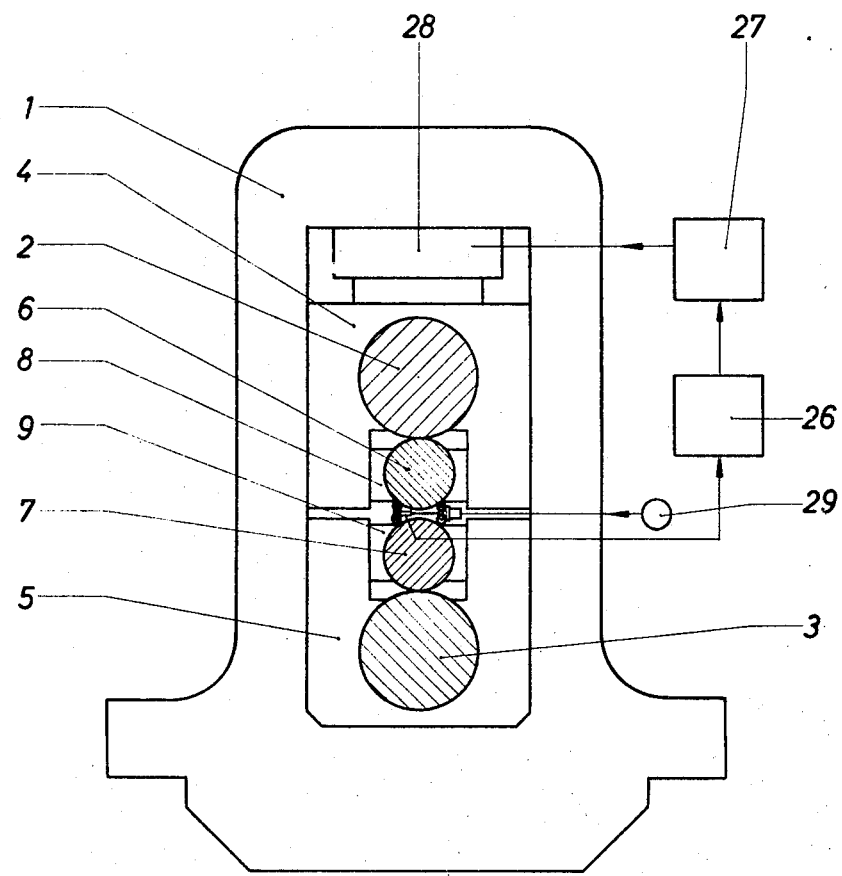

United States Patent
Kreiskorte

[15] 3,646,686
[45] Mar. 7, 1972

[54] MEASURING DEVICES FOR ROLLING MILLS

[72] Inventor: Heinz A. Kreiskorte, Darmstadt-Eberstadt, Germany

[73] Assignee: Moeller & Neumann G.m.b.H.

[22] Filed: Aug. 8, 1969

[21] Appl. No.: 849,303

[30] Foreign Application Priority Data

Aug. 10, 1961 Germany.....................P 17 52 947.4

[52] U.S. Cl............................................................33/182
[51] Int. Cl..........................................................G01b 5/14
[58] Field of Search................33/182, 148 H, 147 A, 143 L, 33/143 A

[56] References Cited

UNITED STATES PATENTS

| 2,224,728 | 12/1940 | Gulliksen | 33/172 |
| 2,249,477 | 5/1941 | Kuehni | 33/178 |
| 2,767,477 | 10/1956 | Esken | 33/174 |

FOREIGN PATENTS OR APPLICATIONS

| 826,201 | 12/1951 | Germany | 33/182 |

Primary Examiner—Leonard Forman
Assistant Examiner—A. J. Mirabito
Attorney—John J. Dennemeyer

[57] ABSTRACT

The invention discloses a measuring device for determining the width of the rolling gap of a rolling mill, wherein variation of the spacing between two work rolls during rolling is detected by means of the correspondingly varying spacing of two roller holders urged into contact with the work rolls on opposite sides of the rolling gap, a stator winding being attached to the one roller holder and a displaceable core in the winding being attached to the other roller holder by means of a rod extending through the rolling gap. Electrical output signals obtained from the winding in consequence of relative displacement of the core may be used for keeping the rolling gap constant. The spacing between the roller holders may be adjustable to cover a range of rolling gap widths.

1 Claim, 2 Drawing Figures

MEASURING DEVICES FOR ROLLING MILLS

The present invention relates to measuring devices for rolling mills and is more particularly concerned with a measuring device suitable for determining the width and, under certain circumstances, for adjusting the rolling gap of a rolling mill.

It is of great importance for a rolling process, in particular for the dimensions of a rolled product, that the width of the rolling gap is maintained constant. Therefore, rolling mills are increasingly provided with automatic control devices for holding the rolling gap at a constant width. For this purpose measuring devices for detecting with the width of the rolling gap are required and their measuring result is applied to a control circuit. A desired rolling gap width can be adjusted and automatically maintained constant by previously setting the control circuit to the desired nominal or working value.

In order to obtain a measure of the width of the rolling gap, thickness measuring devices for the rolled product have been used heretofore; the disadvantage of these devices resides in the fact that a time delay exists between the instant where a change of the rolling gap occurs and the instant when this change is detected by the thickness measuring device, the time delay depending upon the rolling speed and the distance between the rolling gap and the thickness measuring device. This delay results in an undesirable reaction in respect of time of the control circuit; it is impossible to adjust the rolling gap quickly in response to the measuring result.

Furthermore, mechanical measuring devices are known which detect the spacing between the necks of the two work rolls concerned and which thus permit conclusions to be drawn on the width of the rolling gap. The measuring result of these measuring devices, however, is necessarily inaccurate because deformations of the rolls by which the rolling gap is changed cannot be determined by the measuring device to the same degree.

It is an object of the invention to provide a measuring device for determining the width of a rolling gap which avoids the disadvantages of devices used heretofore and enables an exact and highly direct determination of the rolling gap to be obtained.

This problem is solved according to the invention in that the width of the rolling gap is measured by means of a displacement receiver in terms of the spacing between two roll holders thereof which are pressed from the two sides against the upper and lower work rolls and each of which rests with at least one roll on the upper roll and on the lower roll. In contrast to the known devices the measuring device according to the invention determines the rolling gap directly between the two rolls so that deformations of the rolls cannot affect the accuracy of the measuring result.

Preferably, the displacement receiver is an inductive receiver conveniently a differential transformer, the stator winding of which is connected to the one roll holder and the displaceable core of which is connected to the other roll holder by means of a rod extending through the rolling gap. By means of such an inductive receiver, preferably in the form of a differential transformer, a change of spacing of the two rolls can be detected quickly in a simple manner and can be supplied in the form of an electrical measuring signal to a control apparatus; in this case the measuring device is favorably affected by the fact that owing to the arrangement of the two roll holders in the wedge or nip formed between the two rolls the displacement path to be detected by the receiver between the two roll holders is longer than the displacement path of the two work rolls relatively to each other.

A further embodiment of the invention provides that for changing the rolling gap in automatically controlled rolling mills the displaceable core may be displaced by means of an adjusting device disposed on the respective roll holder, for example an adjusting motor. Thereby the displaceable core is mechanically shifted from its zero position in the stator winding and the control circuit effects adjustment of the rolling gap until the displaceable core regains its zero position in the stator winding. By this arrangement, the advantage is obtained that also when the rolling gap is adjusted to different widths, the control process for maintaining constant the respective adjusted width of the rolling gap occurs always in the most sensitive measuring region of the measuring device that is to say in the immediate vicinity of the zero position of the displaceable core. Thereby the rolling gap is safely kept constant with the same accuracy over the whole and possibly large range of rolling gaps to be adjusted.

Figure 2:
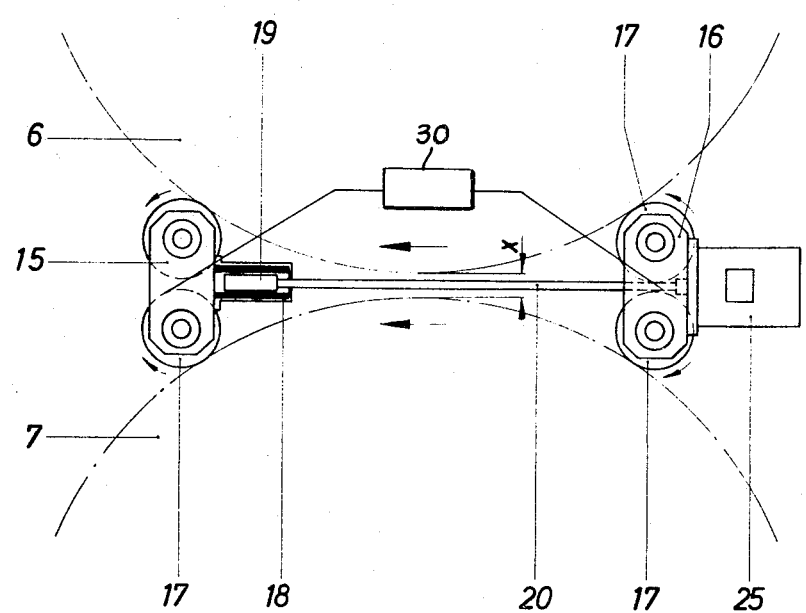

One embodiment of the invention is described below by way of example with reference to the accompanying simplified drawing, in which:

FIG. 1 illustrates a four-high rolling mill, in section, with a measuring device according to the invention, and FIG. 2 illustrates details of the measuring device.

A four-high rolling mill consists of two laterally disposed frames 1 in which two backup rolls 2 and 3 are mounted in chocks 4 and 5. The rolls 2 and 3 support two work rolls 6 and 7 which are guided by means of their chocks 8 and 9 in the chocks 4 and 5 of the two backup rolls 2 and 3.

A compensation device not illustrated in the drawing ensures that the two work rolls 6 and 7 rest on the backup rolls 2 and 3 also when no material to be rolled is located between the work rolls 6 and 7.

The drive of the two backup rolls 2 and 3 is also not illustrated.

The measuring device according to the invention is disposed between the two work rolls 6 and 7 and consists substantially of two roller holders 15 and 16, roller 17 mounted thereon, and a displacement receiver. The rollers 17 rest against the two work rolls 6 and 7 and roll thereon. The roller holders 15 and 16 are urged towards each other by means of a spring 30 which ensures that the rollers 17 rest against the rolls 6 and 7 even when rolling gaps differ in width.

The displacement receiver used in the embodiment illustrated by way of example is an inductive receiver which consists of a stator winding 18 attached to the one roller holder 15 and a displaceable core 19 which is connected to the other roller holder 16 by means of a rod 20 extending through the rolling gap. An adjusting motor 25 disposed on the roller holder 16 serves for displacing the rod 20 longitudinally relatively to the roller holder 16, whereby also the displaceable core 19 is displaced in the stator winding 18. The stator winding 18 may be constructed as a differential transformer, the electrical output signal of which changes as soon as the displaceable core is shifted from its zero position. The electrical signal delivered by the stator winding 18 is applied to a control device 26 which when the displaceable core 19 deviates from its zero position displaces a hydraulic device 27 in the manner that a hydraulic cylinder 28 which is disposed on the frame 1 displaces the rolls 2 and 6 for changing the rolling gap width $x$. When the rolling gap width $x$ increases the two roller holders 15 and 16 are moved towards each other under the effect of the spring in such manner that the displaceable core 19 is shifted to the left relatively to the winding 18; conversely, when the rolling gap width $x$ decreases the two roller holders 15 and 16 are moved further apart so that the displaceable core 19 is shifted to the right relatively to the winding 18.

When the rolling gap width $x$ is to be changed, the adjusting motor 25 is controlled by way of a control device 29 in such manner that the core 19 is displaced in the coil 18; the control device 26 effects then a change of the rolling gap width $x$ until the displaceable core 19 has regained its zero position in the stator winding 18.

The measuring device described can be disposed between the two work rolls 6 and 7 directly adjacent to the material to be rolled in order to detect the width of the rolling gap in a manner as unaffected as possible by disturbing deformations or bending of the rolls.

The measuring device may also be easily applied afterwards to existing rolling mills, no changes of any kind being required at the rolling mill. For example, the measuring device according to the invention can be disposed in this manner in place of a thickness measuring device or additionally to such a device. It is also possible to dispose two measuring devices in the rolling gap one on each side of the material to be rolled. When the measuring device according to the invention cooperates with a conventional thickness measuring device for the material to be rolled the measuring device according to the invention serves for maintaining constancy of the width of the rolling gap, while the actually resulting dimensions of the material to be rolled are continuously controlled by means of the thickness measuring device.

What is claimed is:

1. A device for determining and controlling the rolling gap width between adjacent first and second rolls comprising:
   a. a pair of roller holder means to be disposed on opposite sides of a rolling gap,
   b. a pair of rollers mounted on each of said holder means, one roller in each pair positioned for engagement with a first roll, and the other roller in each pair positioned for engagement with a second roll,
   c. means for biasing said roller holder means toward one another,
   d. a stator winding connected to one of said holder means,
   e. a displaceable core mounted for relative movement in said attaching winding,
   f. a rod means for extension through the rolling gap attaching said displaceable core member to the other of said holder means,
   g. motor means for moving said displaceable core independently of variations in the rolling gap width, and
   h. means for receiving an electrical signal from said stator winding corresponding to the relative displacement of said winding and core member in response to variations in the rolling gap width, and for controlling the gap width.

* * * * *